W. J. KENNEY.
VALVE FOR AUTOMATIC STOKER CONTROLLERS.
APPLICATION FILED OCT. 10, 1914.
1,207,769.
Patented Dec. 12, 1916.
2 SHEETS—SHEET 2.
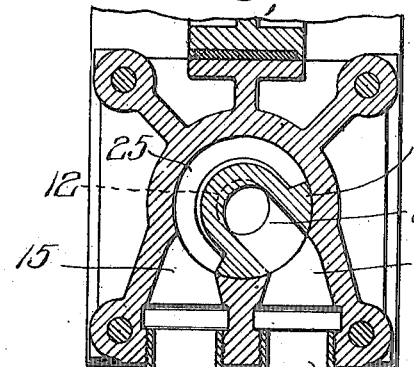
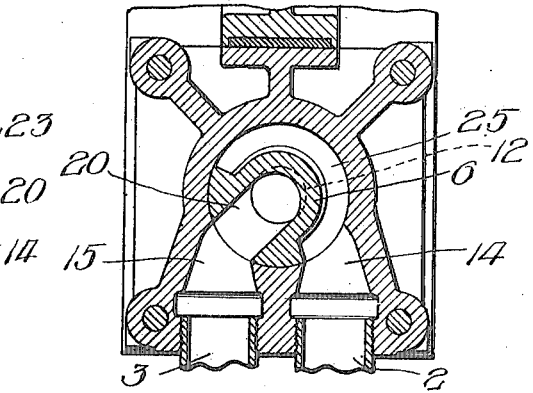
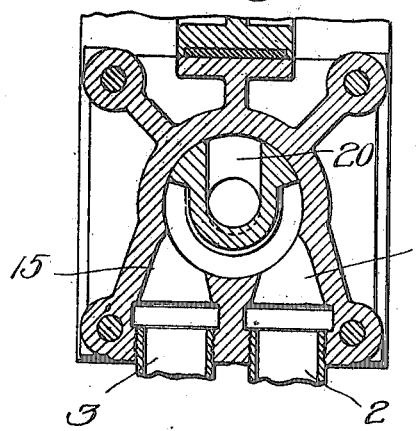
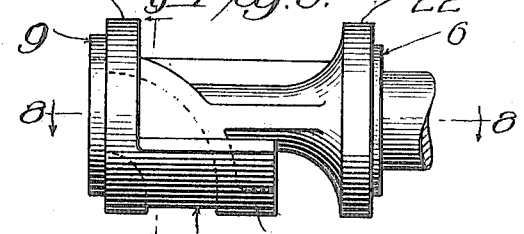
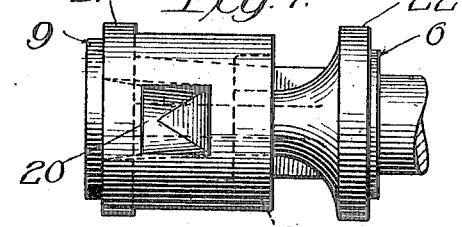
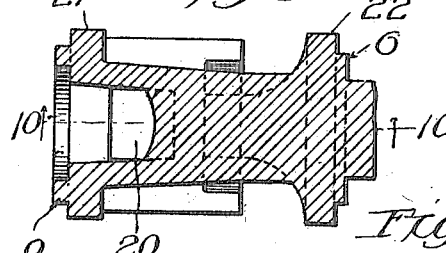
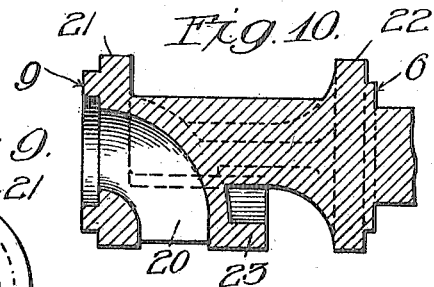
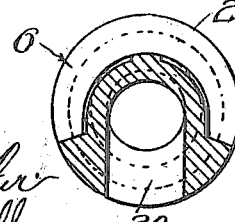
Witnesses:
Harry S. Gather
Ruth E. Getterwall
Inventor:
William J. Kenney
By Chamberlain & Lindenreich
Attys

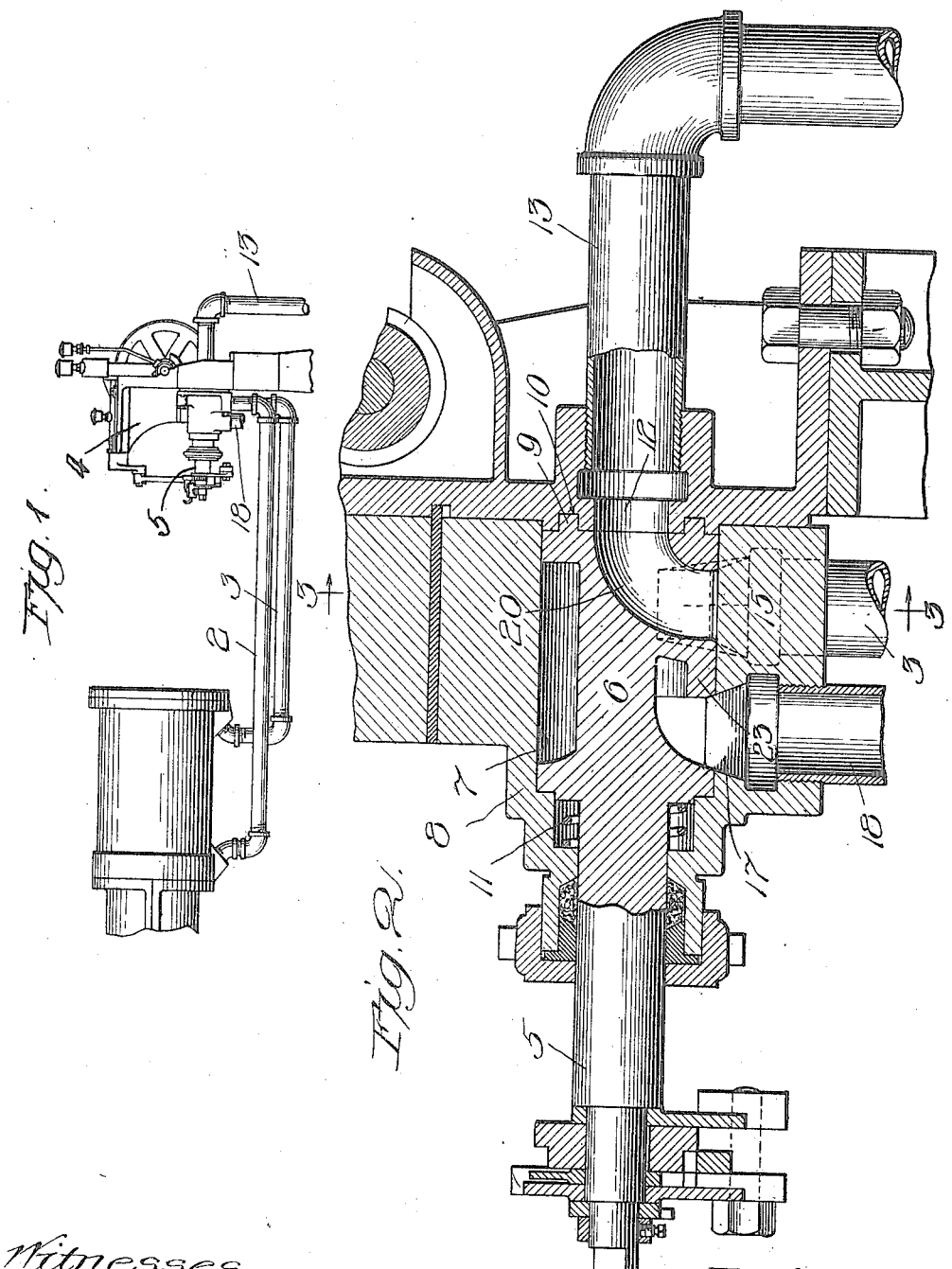

UNITED STATES PATENT OFFICE.

WILLIAM J. KENNEY, OF WILMETTE, ILLINOIS, ASSIGNOR TO UNDER-FEED STOKER COMPANY OF AMERICA, OF CHICAGO, ILLINOIS, A CORPORATION OF NEW JERSEY.

VALVE FOR AUTOMATIC STOKER-CONTROLLERS.

1,207,769. Specification of Letters Patent. Patented Dec. 12, 1916.

Application filed October 10, 1914. Serial No. 866,029.

*To all whom it may concern:*

Be it known that I, WILLIAM J. KENNEY, a citizen of the United States, residing at Wilmette, county of Cook, and State of Illinois, have invented a certain new and useful Improvement in Valves for Automatic Stoker-Controllers, and declare the following to be a full, clear, and exact description of the same, such as will enable others skilled in the art to which it pertains to make and use the same, reference being had to the accompanying drawings, which form a part of this specification.

My invention relates to means for controlling the admission of motive fluid to and its exhaust from the cylinder of the charging mechanism of an underfeed stoker and has for its object to simplify and improve the valve forming part of such means.

Specifically considered, my invention relates to mechanism of the type shown in Patent 951340 granted March 8, 1910, and may be said to have for its object to improve the valve forming part of such mechanism, so as to increase the capacity of the valve without increasing its size.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a side view of the charging cylinder of the stoker and the means for automatically controlling the admission and exhaust of the motive fluid; Fig. 2 is a vertical axial section through the controlling valve and the parts immediately adjacent thereto. Fig. 3 is a section taken on line 3—3 of Fig. 2, on a somewhat smaller scale than Fig. 2; Figs. 4 and 5 are features similar to Fig. 3, illustrating different positions of the valve; Fig. 6 is a side view of a movable member of the valve; Fig. 7 is a bottom plan view of the movable member of the valve; Fig. 8 is a section on line 8—8 of Fig. 6; Fig. 9 is a section on line 9—9 of Fig. 6; and Fig. 10 is a section on line 10—10 of Fig. 8.

Reference being had to the drawings, 1 represents the charging cylinder of an underfeed stoker having pipes, 2 and 3, connected to opposite ends thereof for the purpose of admitting steam, water or other motive fluids thereto and exhausting it therefrom.

4 represents mechanism of the type disclosed in the aforesaid patent, including a valve, and means for turning the valve step by step so as to cause the piston in the stoker cylinder to reciprocate at the desired rate. The last element of the automatic controlling mechanism for the valve is a driven shaft, 5, which, in the present instance, forms the stem of the rotary member, 6, of the valve to which the present invention particularly relates. The member, 6, is in the form of a cylinder fitting revolubly into a cylindrical bore, 7, in a stationary valve casing, 8. The stem, 5, projects out through a suitable stuffing box at the front end of the valve casing. The member, 6, is provided with an annular projection, 9, on its rear end, this projection fitting into an annular groove, 10, in the rear wall of the valve casing. A spring, 11, surrounding the stem, 5, at a point within the casing, serves to press the member, 6, rearwardly and thus maintain a tight joint between the rear end thereof and the valve casing.

The rear wall of the valve casing is provided with a port, 12, of considerable diameter coaxial with the member 6, and, connected to this port, is the supply pipe, 13, for the motive fluid. Near the rear end of the member, 6, and distributed circumferentially about the same are two ports, 14 and 15, formed in the valve casing; these ports being separated from each other, in the arrangement illustrated, a distance equal to the circumferential width of one of the ports and lying in the same transverse plane. In the valve casing, in front of the ports, 14 and 15, and midway between the same, is a third port, 17. The ports, 14 and 15, are connected respectively to the pipes, 2 and 3, leading to the stoker cylinder. The port, 17 communicates with the waste pipe or exhaust pipe, 18.

In the rear end of the movable member, 6, of the valve is a port, 20, whose outer end registers with the port, 12, in the casing and which extends inwardly and laterally so as to bring its inner end at the cylindrical surface of the member, 6, and in position to register successively with the ports, 14 and 15, as the movable member of the valve is rotated. The periphery of the member, 6, is cut away throughout substantially its entire length so as to leave only narrow flange-like unmutilated portions, 21 and 22, at the ends of the member, together with a portion, 23, of full radius completely surrounding the inner end of the port or passage, 20. The space between the flange-like portions, 21 and 22, constitutes an outer port or passage adapted to connect either or both of the ports 14 and 15 with the port 17; the circumferential length of the part, 23, being just sufficient to insure that each of the ports 14 and 15 will be shut off from port, 12, before the other is connected to the port, 17.

Assuming the parts to be in the position indicated in Figs. 2 and 3, motive fluid flows from the supply pipe through the passage, 20, into the pipe, 2, leading to the left hand end of the ram cylinder. At the same time the port or passage around the exterior of the movable valve member, which I shall designate by the reference character 25, connects together the ports 15 and 17, or, in other words, connects the right hand side of the ram cylinder to the discharge pipe, 18. Consequently, the piston in the cylinder is caused to move from the left hand end to the right hand end. The automatic mechanism rotates the movable member of the valve step by step until finally the port 14, is connected to the exhaust port while the port, 15, is connected to the supply port; Fig. 4 showing the conditions of the parts when there is a full opening between the supply pipe and the pipe leading to the right hand end of the cylinder. The piston in the ram cylinder is now forced toward the left. As the step by step rotation of the valve continues, port, 15, is disconnected from the supply side of the valve and is connected to the exhaust side so that both ends of the ram cylinder are connected to exhaust, as indicated in Fig. 5. This condition is maintained until the member, 6, is carried through a sufficient angle to bring the port, 20, into registration with the port, 14, thus connecting the left hand side of the ram cylinder to the supply pipe.

It will be seen that my improved construction provides large passages so disposed that fluids will flow through them without encountering any great resistance; this result being obtained without making the valve large and cumbersome. The valve may be used to advantage where the motive fluid is steam, but it will be found to be particularly useful where the motive fluid is water under pressure, because water travels more slowly than steam and, in order to secure good results, large passageways should be provided, both for admitting it to the ram cylinder and for allowing it to escape therefrom.

While I have illustrated and described in detail only a single preferred form of my invention, I do not desire to be limited to the structural details thus illustrated and described; but intend to cover all forms and arrangements which come within the terms employed in the definition of my invention constituting the appended claims.

I claim:

1. In a device of the character described, a casing having a cylindrical bore, a rotatable member fitting in said bore, a stem projecting from one end of said member out of the casing, said casing having an inlet opening arranged axially of and at the opposite end of said member, said casing also having three ports disposed circumferentially with respect to said member, said member having a passageway extending through the body thereof, adapted to connect the said inlet opening successively to two of the other ports as said member is rotated, and said member having portions cut away at the surface thereof to form an exterior passage adapted to connect the third of said circumferentially disposed ports successively with the other two circumferentially disposed ports and thereafter maintain said three ports in communication with each other during a considerable portion of each rotation of said member, said rotatable member at all times shutting off communication between the inlet opening and said third port.

2. In a device of the character described, a valve casing having a cylindrical bore, a rotatable valve member fitting in said bore, an inlet pipe connected to one end of said bore at the axis thereof, an exhaust pipe connected to the casing and opening into the side of the bore, two delivery pipes connected to the casing and opening into the side of the bore, said rotatable member being constructed and arranged to connect said inlet pipe successively to said delivery pipes and the delivery pipes successively to the exhaust pipe and maintain a connection between both delivery pipes and the exhaust pipe during a considerable portion of each revolution of said member, said rotatable member at all times shutting off communication between the inlet opening and said third port.

3. In a device of the character described, a casing having a cylindrical bore, a rotatable member fitting in said bore, a stem projecting from one end of said member out of the casing, said casing having an inlet opening arranged axially of and at the opposite end of said member, said casing also having three ports disposed circumferentially with respect to said member, said rotatable member being constructed and arranged to complete the following cycle during each revolution, at all times preventing communication between said inlet opening and the third of said ports: connect the inlet opening to the first of said ports and the second of said ports to the third port; connect said second port to the inlet opening and the first port to the third port; and disconnect said second port from the inlet opening and connect it with the third port while maintaining the connection between the latter port and the first port.

4. In a device of the character described, a casing having a cylindrical bore, a rotatable member fitting in said bore, a stem projecting from one end of said member out of the casing, an annular rib on the other end of said member, the casing having an annular groove for the reception of said rib, a spring acting on said member for pressing said rib into said groove, said casing having an inlet opening arranged axially of and at the opposite end of said member from said stem, said casing also having a plurality of ports disposed circumferentially with respect to said member, said member being constructed and arranged to connect the said inlet opening successively to certain of the said ports and to connect each of the latter ports to the remaining port as said member is revolved, said rotatable member at all times shutting off communication between the inlet opening and said third port.

In testimony whereof, I sign this specification in the presence of two witnesses.

WILLIAM J. KENNEY.

Witnesses:
MARGARET FALAHEE,
H. C. TRACY.

Copies of this patent may be obtained for five cents each, by addressing the "Commissioner of Patents, Washington, D. C."